Figures 1, 3:
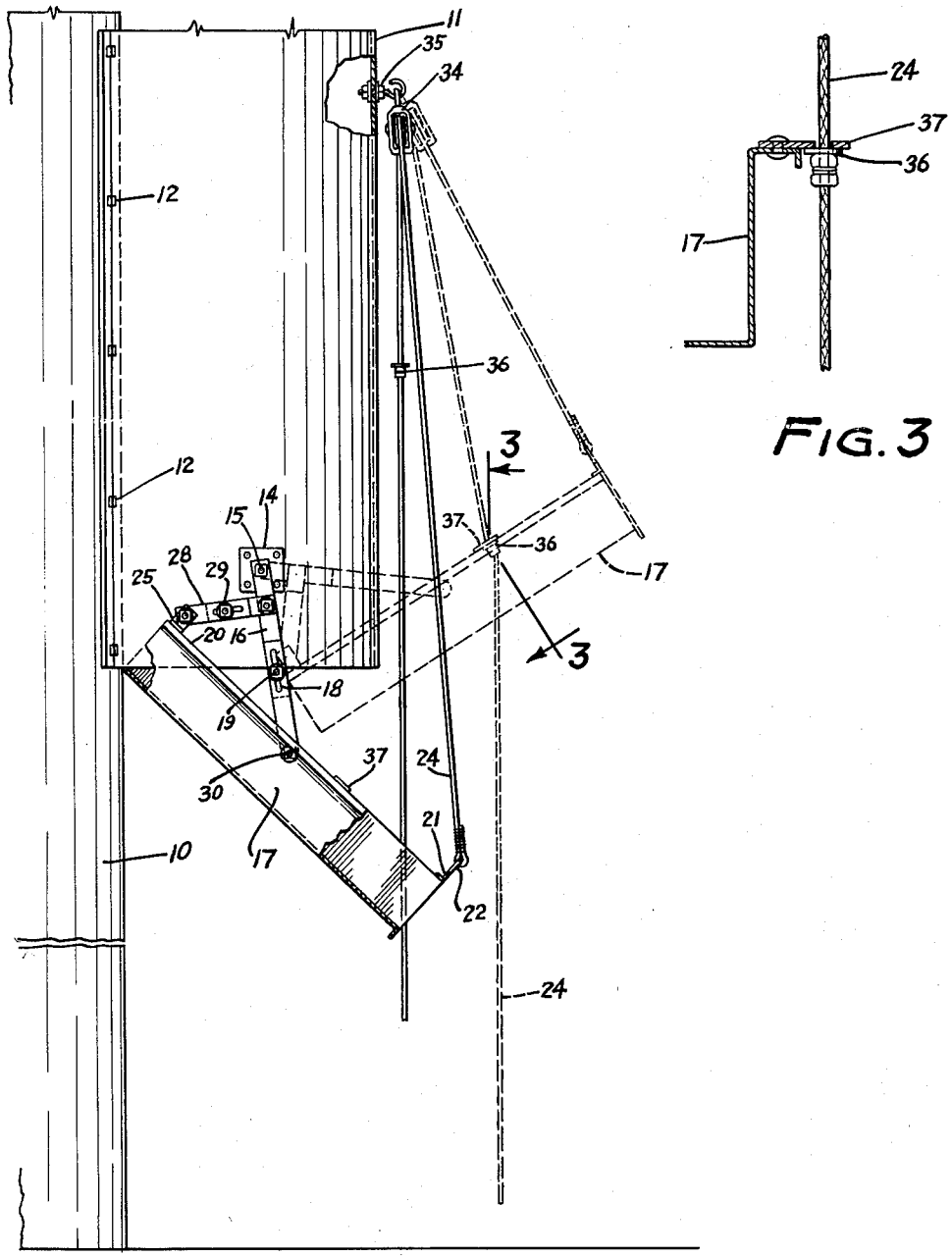

Sept. 8, 1964     R. D. BROTHERTON     3,147,837
ENSILAGE COLLECTING AND GUIDING CHUTE
Filed June 18, 1962     2 Sheets-Sheet 1

INVENTOR.
RAYMOND D. BROTHERTON
BY
*Moore, White & Burd*
ATTORNEYS

United States Patent Office 3,147,837
Patented Sept. 8, 1964

3,147,837
ENSILAGE COLLECTING AND GUIDING CHUTE
Raymond D. Brotherton, Gilmore City, Iowa
Filed June 18, 1962, Ser. No. 203,105
6 Claims. (Cl. 193—17)

This invention is a chute adapted to be connected to the bottom of the fixed ensilage chute on the side of the silo for the purpose of gathering and directing materials discharged from the silo via the fixed chute to a desired location. It is novel in having structure which adapts it to be adjusted to a variety of fixed silo chutes and in having quick acting means for moving and holding the collecting and guiding chute away from the lower end of the fixed silo chute to permit access to the silo which is via the fixed chute.

Ensilage is discharged from silo openings above the base thereof into the fixed silo chute and dropped by gravity into wagons, carts, or other means for dispensing or transporting the ensilage to the point of use. Previously, ensilage was thrown out in rather large bunches. With the advent of the mechanical silo unloader, however, ensilage is discharged into this chute in the form of a constant but not very dense stream of relatively small particles. Accordingly, it became necessary to have some means for collecting this stream and directing it where it is desired. Farmers have improvised many different means for doing this. These means consist mainly of crude chutes constructed from miscellaneous boards, tin and the like that are found at hand.

Such chutes were reasonably satisfactory in gathering and directing the materials discharged, but they were not easily removed when it was desired to gain access to the fixed chute and the inside of the silo. Even with silo unloaders, occasional trips up the silo chute by means of the steps formed in the silo wall are necessary in order to remove doors of the silo discharge openings as the level of ensilage decreases, for example, or to perform maintenance on a mechanical silo unloader. With a crude, more or less permanently affixed chute, it became quite awkward for this access to the silos to be achieved. Accordingly, it is an object of this invention to provide a novel ensilage gathering and directing chute.

It is a further object of this invention to provide an ensilage gathering and directing chute which is movably affixed to the bottom of the principal permanent silo chute.

It is yet another object of this invention to provide such an ensilage gathering and directing chute that can be readily moved out of the way to provide access to the inside of the silo.

Yet another object of this invention is to provide a movable ensilage gathering and directing chute which may be adjusted to accommodate it to permanent silo chutes of a variety of sizes.

Still another object of this invention is to provide a silo ensilage chute in which the discharge angle at which the chute is supported may be altered.

It is a further object of this invention to provide a quickly engageable yet secure means for holding the chute out of the path of one desiring to gain access to the silo.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Figure 2:
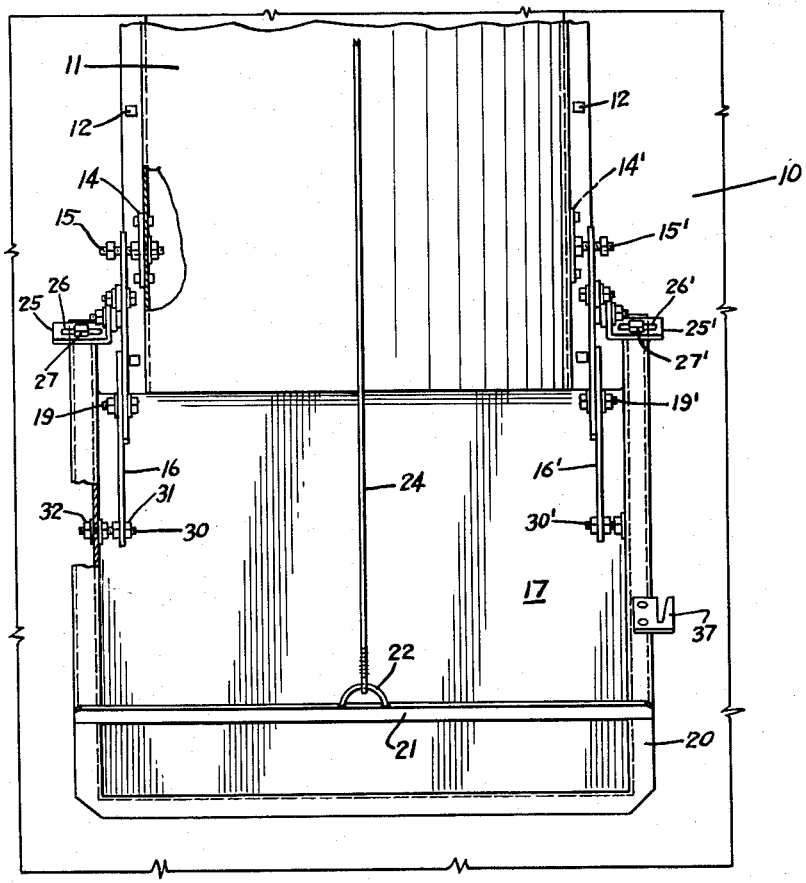

The invention will be described with reference to the drawings in which corresponding numerals refer to the same parts and in which:

FIGURE 1 is a side elevational view of a fragment of a silo with portions broken away to conserve space and showing the discharge chute secured to the bottom of the fixed chute; portions of the discharge chute are broken away to illustrate construction more fully while broken lines show hidden parts; broken lines also illustrate an adjusted position of the device;

FIGURE 2 is a front elevation of the ensilage gathering and discharge chute shown on a fragment of a silo and fixed silo chute with portions of each broken away to show internal construction; broken lines illustrate hidden parts; FIGURE 2 is drawn to a larger scale than FIGURE 1; and FIGURE 3 is a fragmentary sectional view of the catch used in supporting the chute in its raised position and taken on the line and in the direction of the arrows 3—3 of FIGURE 1; this figure is drawn to a larger scale than FIGURE 2.

Referring to the drawings and particularly to FIGURE 1, there is seen a portion of the silo 10 to which a fixed or permanent ensilage guiding chute 11 is secured to any conventional manner as by the lag screws 12.

At the side of chute 10 there is suitably mounted an anchor member 14. This anchor member is conventionally secured to the side of the chute and has securely affixed to it the stud or the like 15 which serves as the pivot on which the arm 16 is movably mounted. The arm 16 is also secured to the chute 17 in a manner that provides for lateral adjustment of the arm 16 with respect to the chute side. A suitable means for adjusting the length of arm 16 may be provided such as the slots 18 and the nut and bolt assembly 19 by means of which the two portions of arm 16 may be fixed in relation to each other or, by loosening the nut and bolt assembly, the remote ends moved toward and away from each other selectively.

Chute 17 is merely a shallow, trough-like arrangement of any suitable material such as sheet metal and having edges formed into the strengthening and stiffening flanges 20. The transverse brace member 21 serves also as a support for the eye member 22 to which a flexible element 24 is secured for raising the end of the chute as will be detailed later.

At the rear of the chute member is the L-shaped bracket 25 in FIGURE 1 which is secured adjustably to the flange 20 as shown in FIGURE 2 as to be laterally movable with respect to the chute. This may be accomplished in any suitable manner as by the slot 26 and the bolt 27 whereby the loosening of the bolt permits lateral sliding of the bracket and clamping of the bolt fixes it with respect to the flange 20. A link member 28 interconnects the bracket 25 with the arm 16. This link 28 is also longitudinally adjustable by structure generally designated 29 similar to the slot and bolt arrangement 18–19 for arm 16. By lengthening the link 28, the reach of the chute from anchor 14 to the silo may be increased in order to accommodate the guide chute to larger silo chutes and reduced in order to accommodate it to smaller ones.

The arm 16 is adjustably secured with respect to width of chute 17 by suitable means here shown illustratively as the threaded rod 30 with threaded nuts 31 on either side of arm 16 and the nuts 32 on either side of the vertical side portion of chute 17. By loosening appropriate ones and tightening others of these nuts, the position of the bar 16 may be varied laterally with respect to the sides of chute 17.

The structure shown and described in connection with the pivotal support of chute 17 in connection with FIGURE 1 is duplicated on the other side of the chute. In FIGURE 2, numbers with primes following them distinguish corresponding parts but at the same time show that they are substantially the same as those described.

Flexible element 24 is reeved through a pulley 34 as shown in FIGURE 1 which in turn is supported on the outer face of chute 11 by suitable means such as the threaded hook bolt assembly 35. The free end of flexible element 24 may extend down to within the reach or grasp of a person standing on the ground.

The flexible element 24 is also provided with a stop means 36 which is secured to the flexible element 24. On the far side of chute 17 from that appearing in FIGURE 1, and shown clearly in FIGURE 2, is a hook plate 37 which is suitably secured to flange 20. When the chute 17 is raised by pulling downward on flexible element 24, the stop 36 is lowered to a point relative to the chute so that it is just below the stop hook 37. Flexible element 34 is then pulled into the hook of plate 37 and stop 36 engages the underside of hook plate 37 which holds chute 17 securely in the position illustrated in broken lines in FIGURE 1. The interaction of the flexible element 24, its stop member 36 and hook plate 37 is also shown clearly in FIGURE 3. As hook plate 37 faces rearwardly and extends just beyond flange 20, flexible element 24 may be easily guided into it by simply moving flexible element 24 over against flange 20 and then along the flange until element 24 engages the hook 37. Releasing downward pull on flexible element 24 permits the weight of the chute 17 to firmly engage stop 36 with the hook plate 37. In order to again place chute 17 in an ensilage receiving and guiding position, the operator merely pulls down on flexible element 24 and moves it rearwardly before releasing pressure. This disengages flexible element 24 from hook plate 37 and upon the release of pressure on line 24 thereafter, chute 17 is lowered again to the position shown in solid lines in FIGURE 1. When raised, chute 17 is held securely against accidental lowering and at the same time it may be quickly and easily elevated out of the path of one desiring to enter the bottom of chute 11 for purposes of climbing the silo.

It is apparent that many modifications and variations of this invention as hereinbefore set forth may be made without departing from the spirit and scope thereof. The specific embodiments described are given by way of example only and the invention is limited only by the terms of the appended claims.

What is claimed:

1. A movable chute for use with a silo having a fixed chute, anchors adapted to be secured to said fixed chute, a trough, arms secured to said trough and pivotally secured to said anchors, links secured to said arms and to one end of said trough, said links being adjustable as to length, a hook adapted to being secured in the wall of a fixed silo chute, a pulley secured to said hook, a flexible member secured to the opposite end of said trough from which said links are secured and reeved over said pulley, a hook plate formed and extending laterally from one side of said trough member, said hook plate having an open ended slot therein, and a stop on said flexible member larger than the opening in said hook plate.

2. The structure of claim 1 in which said trough has laterally extending top flanges, L-shaped brackets having slots in one leg thereof, said slotted bracket legs engaging said top flanges, a clamping bolt and nut assembly engaging said bracket slots and extending through said top flanges, said links being secured to the other legs of said L-shaped brackets, threaded members secured to the ends of said arms remote from said anchors, said threaded members piercing said trough and nuts on both sides of said trough on each of said threaded members for variably clamping said trough along the lengths of said threaded members, whereby lateral variations in the positions of said links and arms are made relative to said trough.

3. The structure of claim 1 in which said arms are selectively variable in length.

4. In combination with a silo having an exterior wall and a fixed ensilage chute secured to said exterior wall, a movable ensilage gathering and directing chute comprising, a pair of anchors secured to said fixed silo chute near its bottom, stud means projecting from said anchors, arms pivotally secured by one end to said anchors, a trough wider than the bottom of said fixed silo chute and secured to the other end of said arms, links secured to said arms and to said trough member near its end that is nearest to the silo exterior wall, said links being variable in length, a hook mounted in said fixed chute above said trough member, a pulley secured to said hook, a flexible element secured at one end to said trough member and extending through said pulley, a hook plate secured to one side of said trough and extending laterally therefrom, said hook plate having a slot opening extending from one edge and parallel to the side of said trough, stop means on said flexible element that is larger than the slot in said hook plate, whereby said flexible element may be pulled to pivot said trough member relative said fixed chute and said flexible member may be manipulated to enter said hook plate slot with said stop means below said hook plate, whereby said trough will be held in a raised position.

5. The structure of claim 4 in which said trough has laterally extending top flanges, L-shaped brackets having slots in one leg thereof, said slotted bracket legs engaging said top flanges, a clamping bolt and nut assembly engaging said bracket slots and extending through said top flanges, said links being secured to the other legs of said L-shaped brackets, threaded members secured to the ends of said arms remote from said anchors, said threaded members piercing said trough and nuts on both sides of said trough on each of said threaded members for variably clamping said trough along the lengths of said threaded members, whereby lateral variations in the positions of said links and arms are made relative to said trough.

6. The structure of claim 4 in which said arms are selectively variable in length.

References Cited in the file of this patent

UNITED STATES PATENTS

| Number | Name | Date |
|---|---|---|
| 358,042 | Ketch | Feb. 22, 1887 |
| 610,690 | Ryder | Sept. 13, 1898 |
| 717,575 | Herring | Jan. 6, 1903 |
| 755,555 | Weaver | Mar. 22, 1904 |
| 889,906 | Claypoole | June 9, 1908 |
| 1,094,726 | Latimer | Apr. 28, 1914 |
| 1,149,899 | De Boer | Aug. 10, 1915 |
| 1,782,734 | MacDougald | Nov. 25, 1930 |
| 2,727,614 | Bauer | Dec. 20, 1955 |
| 3,061,063 | Rutten | Oct. 30, 1962 |